(12) United States Patent
Hildenbeutel et al.

(10) Patent No.: US 10,801,925 B2
(45) Date of Patent: Oct. 13, 2020

(54) TEST BYPASS FOR A COOLING APPARATUS, HAVING A LIQUID VESSEL WITH A VARIABLE PRESSURE LEVEL

(71) Applicant: LINDE AKTIENGESELLSCHAFT, Munich (DE)

(72) Inventors: Jan Hildenbeutel, Winterthur (CH); Hanspeter Wilhelm, Steinmaur (CH)

(73) Assignee: LINDE AKTIENGESELLSCHAFT, Munich (DE)

( * ) Notice: Subject to any disclaimer, the term of this patent is extended or adjusted under 35 U.S.C. 154(b) by 172 days.

(21) Appl. No.: 15/771,433

(22) PCT Filed: Oct. 20, 2016

(86) PCT No.: PCT/EP2016/075229
§ 371 (c)(1),
(2) Date: Apr. 27, 2018

(87) PCT Pub. No.: WO2017/072023
PCT Pub. Date: May 4, 2017

(65) Prior Publication Data
US 2018/0321115 A1 Nov. 8, 2018

(30) Foreign Application Priority Data
Oct. 27, 2015 (DE) .......... 10 2015 013 835

(51) Int. Cl.
*G01M 99/00* (2011.01)
*G01F 1/68* (2006.01)
*G01F 1/76* (2006.01)

(52) U.S. Cl.
CPC ............. *G01M 99/002* (2013.01); *G01F 1/68* (2013.01); *G01F 1/76* (2013.01); *F28F 2200/00* (2013.01)

(58) Field of Classification Search
CPC ........ F28F 27/00; F28F 27/02; F28F 2200/00; G01F 1/68; G01F 1/76; G01M 99/002
See application file for complete search history.

(56) References Cited

U.S. PATENT DOCUMENTS

| | | | |
|---|---|---|---|
| 4,384,460 A * | 5/1983 | Vakil | F25B 9/006 62/114 |
| 2003/0126875 A1 | 7/2003 | Enomoto | |
| 2003/0139894 A1* | 7/2003 | Ryan | G01K 17/12 702/132 |
| 2015/0003495 A1* | 1/2015 | Aspinall | G01M 99/002 374/57 |

FOREIGN PATENT DOCUMENTS

| | | |
|---|---|---|
| CN | 203672810 U | 6/2014 |
| DE | 102011103611 A1 | 12/2012 |

OTHER PUBLICATIONS

International Search Report dated Jan. 13, 2017 issued in corresponding PCT/EP2016/075229 application (3 pages).
English Abstract of DE 102011103611 A1 published Dec. 13, 2012.
English Abstract of CN 203672810 U published Jun. 25, 2014.

* cited by examiner

*Primary Examiner* — Eric S Ruppert
(74) *Attorney, Agent, or Firm* — Millen White Zelano & Branigan, PC; Brion P. Heaney

(57) ABSTRACT

The invention relates to a method for simulation of an isothermal and non-isothermal heating load introduced by a consuming device (V) into a process medium (M) of a cooling apparatus (1), said simulation being by means of a test bypass (2); and the invention further relates to such a test bypass (2), and a cooling apparatus having such a test bypass.

12 Claims, 1 Drawing Sheet

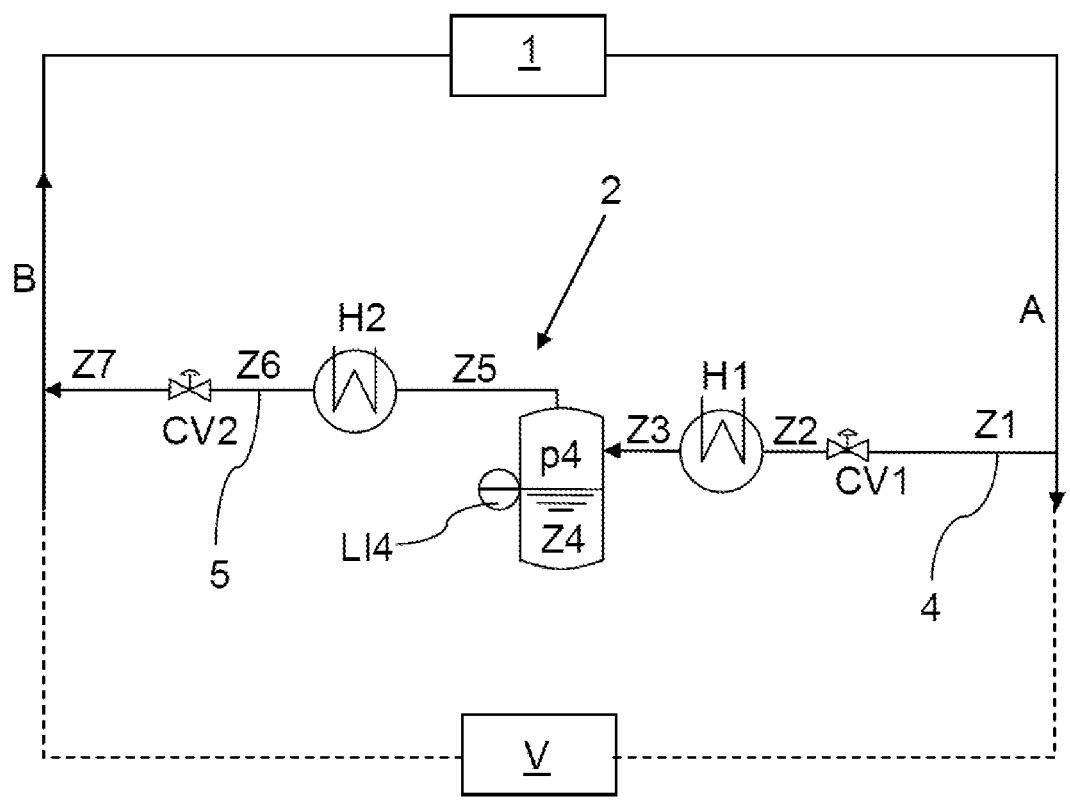

TEST BYPASS FOR A COOLING APPARATUS, HAVING A LIQUID VESSEL WITH A VARIABLE PRESSURE LEVEL

The invention relates to a method for simulation of heat loads in a cooling apparatus, and further relates to a test bypass, and a cooling apparatus with such a test bypass.

The following methods have been employed in the past to simulate the heat load in cooling apparatuses:

(1) A bypass from the inflow to the consuming device to the return flow from the consuming device was provided with heating means through which process medium was flowed, in order to perform one of the following functions:
  (i) Simulate a non-isothermal load. With this arrangement, at no time is the process in the two-phase range of the medium;
  (ii) Simulate an isothermal load. With this arrangement, the specific enthalpy in the inflow upstream of the heating means must be lower than the specific enthalpy at the critical point. Further, the specific enthalpy following the heating must be equal to the specific enthalpy of the saturated vapor. The process pressure of the saturated vapor then corresponds to the process pressure in the return flow;
  (iii) Simulate a cumulated load comprised of an isothermal load and a non-isothermal load. With this arrangement, the specific enthalpy in the inflow upstream of the heating means must be must be lower than the specific enthalpy at the critical point. Further, the specific enthalpy following the heating must be greater than the specific enthalpy of the saturated vapor. The process pressure of the saturated vapor then corresponds to the process pressure in the consuming device which was to be simulated, which pressure is higher than the pressure in the return flow.

A regulating valve disposed upstream or downstream in the bypass regulates either the inflow pressure, the return flow pressure, or the mass flow in the test bypass, or else is set to a fixed position.

(2) Heating means are installed, in a liquid vessel provided in the process, in order to simulate an isothermal load with the aid of the enthalpy of vaporization of the process medium. With this arrangement, the specific enthalpy in the inflow upstream of the heating means must be lower than the specific enthalpy at the critical point. Further, the specific enthalpy after the heating must be equal to the specific enthalpy of the saturated vapor. Here the process pressure of the saturated vapor corresponds to the process pressure in the liquid vessel, and in the return flow, since no regulating valve has been installed between the vessel and the return flow. If a regulating valve is installed in the bypass between the inflow and the vessel, it will regulate either the inflow pressure, the return flow pressure, or the mass flow in the test bypass.

In order to employ heating means to simulate the static process of an isothermal and non-isothermal load, (1)(iii), in a test bypass between the inflow ("forward flow") and the return flow, it is necessary to know three of the following four process data, in order to calculate the lacking value (taking into account conservation of energy):
  (1) The "state point" of the process medium in the inflow;
  (2) The "state point" of the process medium in the return flow;
  (3) The heat load introduced (isothermal plus non-isothermal);
  (4) The mass flow of the process medium.

These "state points" are determined, e.g., with the aid of temperature and pressure sensors, and the mass flow is measured, e.g., by orifice or coriolis measurements.

One application of cooling apparatuses is for cooling of cavities with the aid of a liquid bath. Here the enthalpy of vaporization of the process medium is used to compensate for the heat input in the cavity.

In order to maintain a constant level in the bath, i.e. to provide a quasi-static process, there must be an equilibrium between the vaporized mass and the mass flow liquefied via the cooling apparatus.

For this purpose, the process medium is transported from the cooling device to the consuming device in a transfer line, and the flash gas is returned (either to the cooling apparatus or to a heating means that heats the process medium to the ambient temperature). With this arrangement, the flash gas can function as a shielding gas in a coaxial line, in order to minimize the heat load on the inner inflow. The heat load on the shielding stream, which heat load consists of thermal radiation, and convective conductive heat transfer, leads to a non-isothermal heat input into the return flow.

In order to simulate this combination of an isothermal and a non-isothermal heat load in a test bypass, a number of measurements are needed (see above). However, in cryogenic applications it is very costly to obtain measurements of state values and mass flows of process media, and the measurement tolerances are often substantially higher than for measurements at higher temperatures. Because all of the measurements subject to tolerances are employed in calculating the process variables that are to be determined, the result is correspondingly inaccurate.

Accordingly, the underlying problem of the present invention was to devise a method which enables simulation of a combination of an isothermal and a non-isothermal heat load on a process medium of a cooling apparatus with a comparatively small number of required measurements, and which enables minimization of the global tolerance of the measurements.

This problem is solved by a method having the features set forth in claim 1.

Advantageous refinements of the inventive method are set forth in the various dependent claims, and will be described hereinbelow.

Additional aspects of the invention are claimed in additional independent claims, and will described further hereinbelow.

According to claim 1, a method for simulation of an isothermal or non-isothermal heating load imposed by a consuming device in a process medium of a cooling apparatus is provided, by means of a test bypass, which bypass provides a flow connection between a "forward flow" of the cooling apparatus which "forward flow" is designed and provided to pass process medium from the cooling apparatus to a consuming device, and a "return flow" to the cooling apparatus, which return flow is designed and provided to pass process medium from the consuming device to the cooling apparatus, wherein said test bypass has at least one regulating valve, a first heating means for introducing the isothermal heating load into the process medium, a vessel, and a second heating means for introducing the non-isothermal heating load into the process medium, wherewith in the method the process medium is passed from the inflow ("forward flow") to the return flow via the test bypass (thus bypassing the consuming device), wherein by means of the first heating means a predefined isothermal heating load and by means of the second heating means a predefined non-isothermal heating load is introduced into the process medium, in the test bypass, wherein by means of the at least one regulating valve a process pressure is established in the vessel into which the isothermal heating load is introduced, so that in the vessel a constant level of a liquid phase of the process medium is maintained, wherein in the test bypass a state of the process medium is measured at a particular point, and wherein, using the values of the state of the isothermal heating load and of the process pressure, the mass flow of the process medium at the said point is calculated.

If a consuming device or test bypass is connected to the cooling apparatus, the process medium serves to transport the cooling produced in the cooling apparatus to the consuming device or the test bypass. Coolant (or process medium) heated in the consuming device or test bypass is passed back to the cooling apparatus, so that a coolant loop is established.

By means of the inventive test bypass, a consuming device which is or is to be connected to the cooling apparatus can be simulated in an advantageous manner. It is possible for the consuming device to be connected to the cooling apparatus during the carrying out of the method. However, this is not necessary.

According to the invention, the information obtained in the arrangement is used so that saturated vapor will flow upstream and downstream of the vessel. In other words, the at least one regulating valve is (are) used to adjust the pressure of the process medium such that, at an inlet to the vessel and at an outlet of the vessel, process medium in the form of saturated vapor is flowing.

In the present context, the "state" of the process medium at a point in the test bypass is understood to mean a thermodynamic state of the process medium at the said point, which is completely determined, e.g., by specifying the pressure and temperature of the process medium at the given point.

According to a preferred embodiment of the inventive method, it is further provided that the measurement of the state of the process medium at the described point comprises measurement of the temperature of the process medium and measurement of the pressure of the process medium at the said point.

According to a preferred embodiment of the inventive method, it is further provided that at a second point in the test bypass, the pressure or the temperature of the process medium is measured, and, by means of this pressure or this temperature, and by means of the calculated mass flow and the known non-isothermal heating load $Q_{5-6}$, a state (e.g. pressure and temperature) of the process medium at the second point in the test bypass is determined.

According to another preferred embodiment of the inventive method, it is further provided that the first heating means is disposed upstream of the vessel or in the vessel, and the second heating means is disposed downstream of the vessel.

According to yet another preferred embodiment of the inventive method, it is further provided that the at least one regulating valve is disposed upstream of the first heating means, or is disposed downstream of the first heating means and upstream of the vessel, if the first heating means is not disposed in the vessel.

According to still another preferred embodiment of the inventive method, it is further provided that the at least one regulating valve is disposed downstream of the second heating means, or is disposed upstream of the second heating means and downstream of the vessel. Thus, various locations are possible for the disposition of the at least one regulating valve.

According to a preferred embodiment of the inventive method, a plurality of regulating valves may be provided. Thus, in addition to the at least one regulating valve provided upstream of the vessel (see above), for adjusting the pressure in the vessel, the test bypass may have an additional regulating valve, disposed, e.g., downstream of the second heating means, or disposed, e.g., downstream of the vessel and upstream of the second heating means.

Further, the aforementioned point of the test bypass, at which point the state of the process medium is measured, may be one of the following points (depending on the disposition(s) of the regulating valve(s): a point disposed upstream of the at least one regulating valve and/or upstream of the first heating means; a point disposed downstream of the at least one regulating valve and upstream of the first heating means; a point disposed downstream of the at least one regulating valve and/or downstream of the second heating means; a point disposed upstream of the at least one regulating valve and downstream of the second heating means; a point disposed downstream of the second regulating valve and downstream of the second heating means; a point disposed upstream of the second regulating valve and downstream of the second heating means.

Further, according to another aspect of the invention, a test bypass with the features according to claim 9 is proposed.

According to the invention, this bypass is configured to pass a process medium of a cooling apparatus from a "forward flow" of the cooling apparatus to a return flow of the cooling apparatus, and preferably is used for carrying out the inventive method. The described bypass has at least one regulating valve, a first heating means for introducing an isothermal heating load into a process medium being passed in the test bypass, a vessel for accommodating the process medium, and a second heating means for introducing a non-isothermal heating load into the process medium, as well as means for measuring a state of the process medium at a point of the test bypass, and means for measuring a pressure or temperature of the process medium at a second point of the test bypass.

According to a preferred embodiment of the inventive test bypass, it is provided that the first heating means is disposed upstream of the vessel or in the vessel, and that the second heating means is disposed downstream of the vessel.

According to another preferred embodiment of the inventive test bypass, it is provided that the at least one regulating valve is disposed upstream of the first heating means, or the at least one regulating valve is disposed downstream of the first heating means and upstream of the vessel (in the event that the first heating means is not disposed in the vessel).

According to yet another preferred embodiment of the inventive test bypass, it is provided that the at least one regulating valve is disposed downstream of the second heating means, or the at least one regulating valve is disposed downstream of the vessel and upstream of the second heating means.

According to still another preferred embodiment of the inventive test bypass, it is provided that the test bypass has a second regulating valve, for adjusting the pressure in the vessel, which valve is disposed downstream of the second heating means, or is disposed upstream of the second heating means and downstream of the vessel.

According to a preferred embodiment of the inventive test bypass, it is provided that the point at which the state of the process medium is measured is one of the points described above in connection with the method.

Further, according to another aspect of the invention, a cooling apparatus with the features according to claim 15 is disclosed.

The cooling apparatus serves to provide cooling by means of a process medium, which cooling apparatus has an inventive test bypass which provides a flow connection between a "forward flow" of the cooling device and a return flow of the cooling device (see above).

BRIEF DESCRIPTION OF THE DRAWING

Additional features and advantages of the invention will be described hereinbelow with the aid of an exemplary embodiment of the invention and the accompanying drawing.

FIG. 1 is a schematic representation of a test bypass in a cooling apparatus according to an embodiment of the invention.

FIG. 1 illustrates a cooling apparatus 1 wherein a combination of an isothermal and a non-isothermal heating load is to be simulated, which load may be produced, e.g., by a consuming device V which is also illustrated in FIG. 1. To simulate the heating loads, according to the invention a test bypass 2 is employed which provides a flow connection between the "forward flow" A of the cooling apparatus 1 and the return flow B of the cooling apparatus 1.

The test bypass 2, in which the process medium M is passed around or past the consuming device V (so as to bypass the consuming device V) and is sent to the return flow B, has a first heating means H1 which introduces the determined isothermal load $Q_{2-3}$ into the process. Downstream of the first heating means H1, a vessel G for accommodating the process medium M is provided, and downstream of vessel G a second heating means H2 is provided. With the aid of a regulating valve CV1 or CV2, disposed downstream of the first heating means H1 (regulating valve CV1) or downstream of the second heating means H2 (regulating valve CV2), the process pressure p4 is established (adjusted) in the liquid vessel G, where the isothermal load $Q_{2-3}$ is introduced.

With the aid of process status measuring means at point Z1 (measuring e.g. temperature and pressure, by suitable means 4), and with knowledge of the load $Q_{2-3}$ which is applied, and the pressure p4, and taking into account the energy balance, the mass flow m at point Z1 can be determined. With this it is assumed that a quasi-static process is in effect, and thus that the level-measuring means LI4 in the liquid vessel G shows a constant level. In this connection, the thermodynamic constraint is employed that saturated vapor at the process pressure p4 is flowing at points Z3 and Z5. Once the mass flow m is known, then the status at each status point in the test bypass 2 can be determined, via the known heating load $Q_{5-6}$, if a pressure measurement is available for each position (e.g. [via] means 5). In general, means for measuring pressure and/or temperature may be provided at each of the points of the test bypass 2 (e.g. points Z1 to Z7).

In the quasi-static case under consideration (with a constant level of the liquid phase in the vessel G), then the following is true for the derivatives of the mass flow with respect to time, at points Z1 to Z7:

$$dm/dt(1)=dm/dt(2)=dm/dt(3)=dm/dt(5)=dm/dt(6)=dm/dt(7)$$

$$LI4 = \text{constant}.$$

Further, for the specific enthalpies at the individual points Z1 to Z7:

$$h_1 = h_2$$

$$h_3 = h_5 = h_{saturated\ vapor}\ (\text{at } p4)$$

$$h_6 = h_7; \text{ and}$$

$$Q_{2-3} = dM/dt^*(h_3 - h_2) = dm/dt^*(h_{saturated\ vapor}\ (\text{at } p_4) - h_2)$$

$$Q_{5-6} = dM/dt^*(h_6 - h_5) = dm/dt^*(h_6 - h_{saturated\ vapor}\ (\text{at } p_4)).$$

Here, $h_x$ represents the specific enthalpy at point x of the test bypass 2, $p_x$ represents the static pressure at point x, $Qx_{-x+1}$ represents the heating load which is introduced to the process between point x and point x+1, and LI4 represents the measured level in the liquid vessel G.

Using the above equations, the desired quantities may be readily calculated.

Thus, with the aid of the heat introduced, $Q_{2-3}$, and the known pressure p4 at the "state point" Z4 and [sic] the known "state point" Z1, one can determine the mass flow.

The following are known:

$$h_1(p1, T1) = h_2,$$

$$h_5 = h_{saturated\ vapor}(p4).$$

The following are to be determined:

$$dm/dt = Q_{2-3}/(h_5 - h_2) = Q_{2-3}/(h_{saturated\ vapor}(p4) - h_1(p1, T1)).$$

Using the inventive arrangement and method, it is possible, advantageously, to minimize the required number of measurements and the global tolerance of the measurements. The information obtained with the arrangement is utilized such that saturated vapor flows upstream and downstream of the liquid vessel G.

Also, with the introduction of an additional regulating valve CV2 (e.g. downstream of the second heating means H2), any pressure between p1 and p7 in the vessel may be set, with p1 being the pressure at Z1 and p7 being the pressure at Z7, and thereby isothermal loads of different modes can be simulated at the corresponding different temperature levels. Further, there is a clear difference between the isothermal load $Q_{2-3}$ (from the heating means H1) and the isothermal load $Q_{5-6}$ (from the heating means H2), which can be advantageous during the acceptance test, and for regulation of the apparatus. The heating means H1 and H2 may be, e.g., electric heating means.

Instead of measurements being made at the "state point" Z1, they may be made at another point (at "state point" Z2, Z6, or Z7), or the mass flow m may be measured and then values at other "state points" may be derived from it.

Instead of pressure measurements, temperature measurements may be made, from which values at any point may be obtained for the exact "state point".

In alternative embodiments (not shown) the first heating means H1 may disposed upstream of the regulating valve CV1 or in the liquid vessel G. Alternatively or additionally, the second heating means H2 may be disposed downstream of the second regulating valve CV2 (not shown in FIGURE).

LIST OF REFERENCE NUMERALS

| 1 | Cooling apparatus |
| --- | --- |
| 2 | Test bypass |
| 4 | Means for measuring a state of the process medium |

| | |
|---|---|
| 5 | Means for measuring the pressure or temperature |
| CV1, CV2 | Regulating valve |
| G | Vessel. |
| H1 | First heating means |
| H2 | Second heating means |
| LI4 | Level of the process medium in the vessel |
| M | Process medium |
| Z1 to Z7 | Points of the test bypass |
| A | Inflow ("forward flow") |
| B | Return flow |
| V | Consuming device |

The invention claimed is:

1. A method for simulating isothermal and non-isothermal heating loads imposed by a consuming device (V) in a process medium (M) of a cooling apparatus (1), said method comprising:

providing a test bypass having a flow connection between a forward flow (A) of the cooling apparatus (1) and a return flow (B) of the cooling apparatus (1), wherein the test bypass (2) further comprises at least one regulating valve (CV1, CV2), a first heater (H1) for introducing an isothermal heating load, a vessel (G), and a second heater (H2) for introducing an non-isothermal load, passing the process medium (M) from the forward flow (A) through the test bypass (2) to the return flow (B), introducing a predefined isothermal heating load by means of the first heater (H1) into the process medium (M) and introducing a predefined non-isothermal heating load by means of the second heater (H2) into the process medium (M), establishing a process pressure (p4), by means of the at least one regulating valve (CV1, CV2), in the vessel (G) into which the isothermal heating load is introduced, so that in the vessel (G) a constant level (LI4) of a liquid phase (F) of the process medium (M) is maintained, measuring at a point (Z1, Z2, Z6, Z7) in the test bypass (2) a state of the process medium (M), and using the measured state of the isothermal heating load at said point (Z1, Z2, Z6, Z7) and the process pressure (p4) at said point (Z1, Z2, Z6, Z7), calculating the mass flow (m) of the process medium (M) at said point.

2. The method according to claim 1, wherein the measuring of the state of the process medium (M) at said point (Z1, Z2, Z6, Z7) comprises measuring the temperature of the process medium (M) at said point and measuring the pressure of the process medium (M) at said point.

3. The method according to claim 1, further comprising measuring at a second point in the test bypass (2) the pressure or temperature of the process medium (M), and by means of the pressure or temperature measured at said second point, the calculated mass flow (m), and the non-isothermal heating load, determining a state of the process medium (M) at the second point in the test bypass (2).

4. The method according to claim 1, wherein the first heater (H1) is disposed upstream of the vessel (G); and the second heater (H2) is disposed downstream of the vessel (G).

5. The method according to claim 1, wherein the at least one regulating valve (CV1) is disposed upstream of the first heater (H1).

6. The method according to claim 1, wherein the at least one regulating valve (CV2) is disposed downstream of the second heater (H2).

7. The method according to claim 5, wherein the test bypass (2) has a second regulating valve (CV2), for adjusting the pressure (p4) in the vessel (G), wherein the second regulating valve (CV2) is disposed downstream of the second heater (H2).

8. The method according to claim 7, wherein the point (Z1, Z2, Z6, Z7) is one of the following points of the test bypass (2):

a point (Z1) disposed upstream of the at least one regulating valve (CV1) and/or upstream of the first heater (H1);

a point (Z2) disposed downstream of the at least one regulating valve (CV1) and upstream of the first heater (H1);

a point (Z7) disposed downstream of the at least one regulating valve (CV2) and/or downstream of the second heater (H2);

a point (Z6) disposed upstream of the at least one regulating valve (CV2) and downstream of the second heater (H2);

a point (Z7) disposed downstream of the second regulating valve (CV2) and downstream of the second heater (H2); and a point (Z6) disposed upstream of the second regulating valve (CV2) and downstream of the second heater (H2).

9. The method according to claim 1, wherein the first heater (H1) is disposed in the vessel (G); and the second heater (H2) is disposed downstream of the vessel (G).

10. The method according to claim 1, wherein the at least one regulating valve (CV1) is disposed downstream of the first heater (H1) and upstream of the vessel (G).

11. The method according to claim 1, wherein the at least one regulating valve (CV2) is disposed downstream of the vessel (G) and upstream of the second heater (H2).

12. The method according to claim 5, wherein the test bypass (2) has a second regulating valve (CV2), for adjusting the pressure (p4) in the vessel (G), wherein the second regulating valve (CV2) is disposed downstream of the vessel (G) and upstream of the second heater (H2).

* * * * *